US012132165B2

(12) United States Patent
Fujii et al.

(10) Patent No.: US 12,132,165 B2
(45) Date of Patent: Oct. 29, 2024

(54) ALL-SOLID-STATE BATTERY

(71) Applicant: FDK CORPORATION, Tokyo (JP)

(72) Inventors: Shinzo Fujii, Tokyo (JP); Yuji Goto, Tokyo (JP); Masakazu Kobayashi, Tokyo (JP); Tomohiro Fujisawa, Tokyo (JP); Yoichiro Kawano, Tokyo (JP); Masanori Nakanishi, Tokyo (JP); Chihiro Yamamoto, Tokyo (JP); Akihiko Kato, Tokyo (JP)

(73) Assignee: FDK CORPORATION, Tokyo (JP)

( * ) Notice: Subject to any disclaimer, the term of this patent is extended or adjusted under 35 U.S.C. 154(b) by 1107 days.

(21) Appl. No.: 16/996,910

(22) Filed: Aug. 19, 2020

(65) Prior Publication Data
US 2020/0381775 A1   Dec. 3, 2020

Related U.S. Application Data

(63) Continuation of application No. PCT/JP2019/003164, filed on Jan. 30, 2019.

(30) Foreign Application Priority Data

Feb. 20, 2018 (JP) ................................. 2018-027714
Oct. 25, 2018 (JP) ................................. 2018-201183

(51) Int. Cl.
*H01M 10/0562* (2010.01)
*H01M 4/525* (2010.01)

(52) U.S. Cl.
CPC ....... *H01M 10/0562* (2013.01); *H01M 4/525* (2013.01)

(58) Field of Classification Search
CPC ............. H01M 10/0562; H01M 4/525; H01M 2300/0068; H01M 4/62; H01M 4/485;
(Continued)

(56) References Cited

U.S. PATENT DOCUMENTS

2006/0091363 A1* 5/2006 Barker ...................... H01B 1/08
                                                           252/518.1
2008/0038635 A1* 2/2008 Sheem ................... H01M 4/139
                                                           429/231.95
(Continued)

FOREIGN PATENT DOCUMENTS

JP   2006-261008   *  6/2006   .......... H01M 10/052
JP   2009-181921 A    8/2009
(Continued)

OTHER PUBLICATIONS

Machine translation of JP 2006-261008, retrieved from <www.espacenet.com> on Nov. 29, 2023. (Year: 2006).*
(Continued)

*Primary Examiner* — Cynthia K Walls
(74) *Attorney, Agent, or Firm* — Isshiki & Partners; Joseph P. Farrar, Esq.

(57) ABSTRACT

An all-solid-state battery includes an electrode body in which a cathode layer that contains a cathode active material and a solid electrolyte, an electrolyte layer that is formed of the solid electrolyte, and an anode layer that contains an anode active material and the solid electrolyte are stacked in this order in an up-down direction, in which the cathode active material is a compound represented by a chemical formula $Li_2Fe_{(1-x)}M_xP_{(2-y)}A_yO_7$, contains at least one metal of Ti, V, Cr, Ni, and Co as the M in the chemical formula, and contains at least one element of B, C, Al, Si, Ga, and Ge as the A in the chemical formula, the x in the chemical formula satisfies $0.8 < x \leq 1$, the y in the chemical formula satisfies $0 \leq y \leq 0.07$, and the anode active material is an anatase titanium oxide represented by a chemical formula $TiO_2$.

5 Claims, 9 Drawing Sheets

(58) Field of Classification Search
CPC ........... H01M 4/5825; H01M 10/0525; H01M 4/136; H01M 10/0585; Y02E 60/10; Y02P 70/50; H01B 1/06
See application file for complete search history.

(56) References Cited

U.S. PATENT DOCUMENTS

| | | | |
|---|---|---|---|
| 2009/0197178 A1* | 8/2009 | Inda | H01M 10/0562 429/231.95 |
| 2009/0197182 A1 | 8/2009 | Katoh | |
| 2013/0273437 A1 | 10/2013 | Yoshioka et al. | |

FOREIGN PATENT DOCUMENTS

| | | |
|---|---|---|
| JP | 2009-206094 A | 9/2009 |
| JP | 2011-198692 A | 10/2011 |
| JP | 5312969 B | 10/2013 |
| JP | 2014-194846 A | 10/2014 |
| JP | 2015-060737 A | 3/2015 |
| JP | 2016-038996 A | 3/2016 |
| JP | 2016-103381 A | 6/2016 |
| JP | 2017-182945 A | 10/2017 |
| WO | 2012/008422 A1 | 1/2012 |

OTHER PUBLICATIONS

Ye, General observation of Fe3+/Fe2+ redox couple close to 4 V in partially substituted Li2FeP2O7 pyrophosphate solid-solution cathodes, Chemistry of Materials, 2013, 25, 3623-3629. (Year: 2013).*
International Search Report (ISR) for Application No. PCT/JP2019/003164 dated Jul. 5, 2019.
English Translation of the ISR for Application No. PCT/JP2019/003164 dated Jul. 5, 2019.
J. K. Feng, L. Lu, "Lithium storage capability of lithium ion conductor Li1.5Al0.5Ge1.5(PO4)3", Journal of Alloys and Compounds vol. 501, Issue 2, Jul. 9, 2010, pp. 255-258.
Masahiro Tatsumi and Akitoshi Hayashi, http://www.chem.osakafu-u.ac.jp/ohka/ohka2/research/battery_li.pdf, Chemistry vol. 67, No. 7, Jul. 2012, pp. 19-23.
Written Opinion of the International Search Authority for Application No. PCT/JP2019/003164 dated Jul. 5, 2019.
Partial translation of Written Opinion of the International Search Authority for Application No. PCT/JP2019/003164 dated Jul. 5, 2019.
Notice of Preliminary Rejection in Korean Patent Application No. 10-2020-7023000 dated May 21, 2024.
Translation of Notice of Preliminary Rejection in Korean Patent Application No. 10-2020-7023000 dated May 21, 2024.

* cited by examiner

ALL-SOLID-STATE BATTERY

CROSS-REFERENCE TO RELATED APPLICATIONS

This is a continuation application of International Patent Application No. PCT/JP2019/003164 filed Jan. 30, 2019, which claims the benefit of priority to Japanese Patent Application Nos. 2018-027714 and 2018-201183 filed Feb. 20, 2018 and Oct. 25, 2018, respectively. The entire contents of the International Patent Application are hereby incorporated herein by reference.

BACKGROUND

Technical Field

The present disclosure relates to an all-solid-state battery.

Description of the Related Art

Lithium secondary batteries are known to have high energy densities among various secondary batteries. However, lithium secondary batteries that are widely available in general use flammable organic electrolyte solutions as electrolytes. For this reason, for lithium secondary batteries, safety measures against leakage, short circuit, overcharge, and the like are more strictly required than for the other batteries. In view of this, researches and developments have actively been conducted on all-solid-state batteries using oxide-based and sulfide-based solid electrolytes as electrolytes. Solid electrolytes are materials mainly containing ion conductors capable of conducting ions in the solids, and in principle do not cause various problems attributable to flammable organic electrolyte solutions unlike the conventional lithium secondary batteries. All-solid-state batteries in general have structures in which a current collector is formed in an integral sintered body (hereinafter also referred to as a stacked electrode body) obtained by interposing a layer-shaped solid electrolyte (electrolyte layer) between a layer-shaped cathode (cathode layer) and a layer-shaped anode (anode layer).

The above-described stacked electrode body can be prepared by using a known green sheet method. One example of methods for preparing stacked electrode bodies using the green sheet methods will be described below. First, a slurry cathode layer material containing a cathode active material and a solid electrolyte, a slurry anode layer material containing an anode active material and a solid electrolyte, and a slurry electrolyte layer material containing a solid electrolyte are molded into sheet-shaped green sheets, respectively. A stacked body is obtained by sandwiching the green sheet containing the electrolyte layer material (hereinafter also referred to as an electrolyte layer sheet) with the green sheet containing the cathode layer material (hereinafter also referred to as a cathode layer sheet) and the green sheet containing the anode layer material (hereinafter also referred to as an anode layer sheet) and is press-bonded, and the stacked body after the press-bonding is fired. In this way, a stacked electrode body, which is a sintered body, is completed. Note that, a fundamental method for manufacturing an all-solid-state battery is described in Japanese Patent Application Publication No. 2009-206094, for example. In addition, Japanese Patent Application Publication No. 2017-182945 describes a chip-shaped all-solid-state battery prepared using a doctor blade method.

As the electrode active material, materials used for the conventional lithium secondary battery can be used. In addition, since the all-solid-state batteries use no flammable electrolyte solutions, it is possible to obtain higher potential differences. Hence, electrode active materials having higher energy densities have also been studied. For example, Japanese Patent Application Publication No. 2014-194846 describes a cathode active material that is represented by the chemical formula $Li_2Fe_{(1-x)}M_xP_2O_7$ and exhibits a significantly high energy density in the simulation based on the first principle calculation. In addition, Japanese Patent No. 5312969 also describes a cathode active material for a lithium secondary battery, that is represented by the chemical formula $Li_2MP_{(2-x)}A_xO_7$ and exhibits a significantly high energy density.

As the solid electrolyte, a NASICON-type oxide-based solid electrolyte that is represented by the general formula $Li_aX_bY_cP_dO_e$ can be used. As the NASICON-type oxide-based solid electrolyte, $Li_{1.5}Al_{0.5}Ge_{1.5}(PO_4)_3$ (hereinafter also referred to as LAGP) described in J. K. Feng, L. Lu, "Lithium storage capability of lithium ion conductor Li1.5Al0.5Ge1.5(PO4)3", Journal of Alloys and Compounds Volume 501, Issue 2, 9 Jul. 2010, Pages 255-258 is well known. Note that the summary of the all-solid-state battery is described in Masahiro TATSUMI and Akitoshi HAYASHI, Graduate School of Engineering, Osaka Prefecture University, "ZENKOTAIDENCHI NO SAIZENSEN (The forefront of all-solid-state batteries)", [online], [retrieved on Sep. 13, 2018], the Internet <URL: http://www.chem.osakafu-u.ac.jp/ohka/ohka2/research/battery_li.pdf>.

To improve the characteristics of an all-solid-state battery, it is important to increase the potential difference between the cathode and the anode. In other words, it is necessary to appropriately select electrode active materials used for the cathode and the anode. In this regard, it is desirable that the cathode active material have a higher potential (vs $Li/Li^+$) than the metallic lithium potential and that the anode active material have a lower potential. However, on the other hand, it is also necessary to select more stable electrode active materials in consideration of the safety and the like.

The cathode active materials described in Japanese Patent Application Publication No. 2014-194846 and Japanese Patent No. 5312969 can be represented as the chemical formula $Li_2Fe_{(1-x)}M_xP_{(2-y)}A_yO_7$, collectively. A cathode active material represented by this chemical formula is expected to cause multi-electron reactions and have a high energy density, according to the simulation using the first principle calculation. However, to obtain a practical cathode active material, it is necessary to appropriately select values of x and y, a metal for M, and an element for A in the chemical formula. In addition, since the all-solid-state battery cannot be established with only the cathode, it is also necessary to appropriately select the anode active material suitable for the cathode active material.

In view of this, an object of the present disclosure is to provide an all-solid-state battery that uses a compound represented by $Li_2Fe_{(1-x)}M_xP_{(2-y)}A_yO_7$ as a cathode active material and has a high energy density.

SUMMARY

An aspect of the present disclosure to achieve the above objective is an all-solid-state battery comprising:
  an electrode body in which a cathode layer that contains a cathode active material and a solid electrolyte, an electrolyte layer that is formed of the solid electrolyte, and an anode layer that contains an anode active material and the solid electrolyte are stacked in this order in an up-down direction, wherein
the cathode active material is a compound represented by a chemical formula $Li_2Fe_{(1-x)}M_xP_{(2-y)}A_yO_7$, contains at least one metal of Ti, V, Cr, Ni, and Co as the M in the chemical formula, and contains at least one element of B, C, Al, Si, Ga, and Ge as the A in the chemical formula,
the x in the chemical formula satisfies $0.8<x\leq1$,
the y in the chemical formula satisfies $0\leq y\leq 0.07$, and
the anode active material is an anatase titanium oxide represented by a chemical formula $TiO_2$.

The all-solid-state battery, wherein the cathode active material may contain at least one metal of Ni and Co as the M in the chemical formula. Further, the all-solid-state battery, wherein at least one element of Al and Si is contained as the A in the chemical formula.

The all-solid-state battery, wherein preferably
the cathode active material is a compound represented by a chemical formula $Li_2Fe_{(1-x)}Co_yP_2O_7$,
the x in the chemical formula satisfies $0.8<x<1$, and
the cathode active material is such that the second Li contained in the chemical formula contributes to the Redox reaction, and has an energy density greater than 791 mWh/g. The all-solid-state battery, wherein preferably the cathode active material is $Li_2CoP_2O_7$. The solid electrolyte is more preferably a compound represented by a general formula $Li_{1.5}Al_{0.5}Ge_{1.5}(PO_4)_3$.

Further, the all-solid-state battery is also within the scope of the present disclosure, wherein
with one of directions orthogonal to the up-down direction being defined as a front-back direction, a cathode terminal is formed on an end face of a battery main body formed of a cuboid-shaped sintered body on one side in the front-back direction, and an anode terminal is formed on an end face of the battery main body on an opposite side in the front-back direction,
in the battery main body, one or more unit cells are buried in the solid electrolyte,
in each unit cell, a cathode current collector and an anode current collector are stacked respectively on one side of the electrode body in the up-down direction and on an opposite side of the electrode body in the up-down direction, and
a predetermined one of the cathode current collectors is coupled to the cathode terminal and a predetermined one of the anode current collectors is coupled to the anode terminal.

According to the present disclosure, an all-solid-state battery that uses a compound represented by $Li_2Fe_{(1-x)}M_xP_{(2-y)}A_yO_7$ as a cathode active material and has a high energy density is provided.

DETAILED DESCRIPTION

Figure 1:
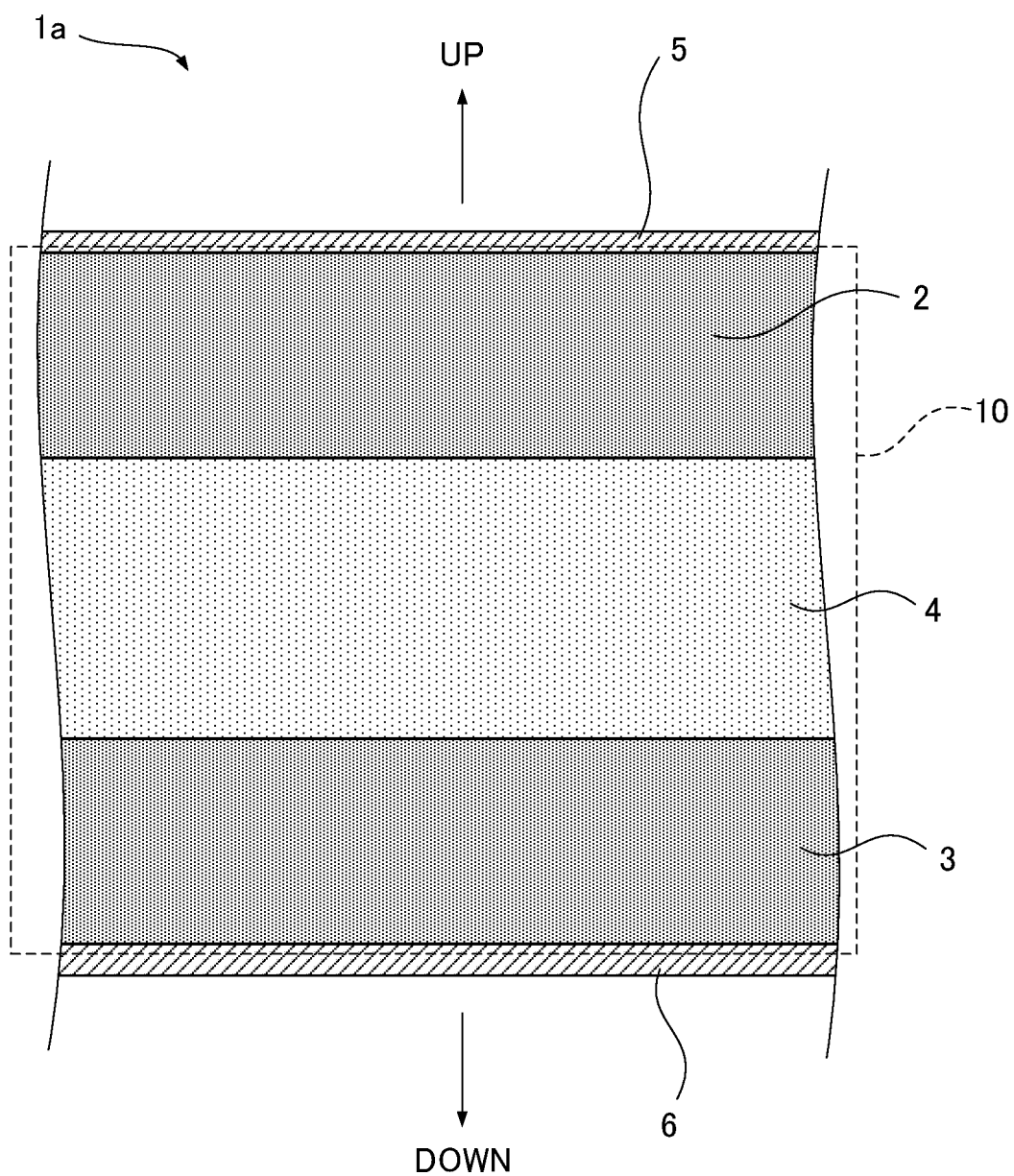
FIG. 1 is a view showing an all-solid-state battery according to an embodiment of the present disclosure.

In describing embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

Referring now to the drawings, wherein like reference numerals designate identical or corresponding parts throughout the several views thereof, all-solid-state batteries according to embodiments of the present disclosure are described. As used herein, the singular forms "a", "an", and "the" are intended to include the plural forms as well, unless the context clearly indicates otherwise.

Process of Arriving at the Present Disclosure

PTL 3 and PTL 4 described above show cathode active materials for lithium secondary batteries, which are operated by multi-electron reactions based on the simulation using the first principle calculation. The cathode active materials described in PTL 3 and PTL 4 may be collectively defined as a compound represented by the chemical formula $Li_2Fe_{(1-x)}M_xP_{(2-y)}A_yO_7$, wherein M is any one or more metals of at least Ti, V, Cr, Ni, and Co, and A is any one element of B, C, Al, Si, Ga, and Ge. In addition, PTL 3 and 4 describe $Li_2CoP_2O_7$, that is, the chemical formula $Li_2Fe_{(1-x)}M_xP_{(2-y)}A_yO_7$ wherein M is Co, and x=1 and y=0. Moreover, PTL 3 states it is preferable that the value of y in the chemical formula be such that $0<y\leq0.07$ based on the simulation. Hence, a cathode active material that encompasses both cathode active materials described in PTL 3 and PTL 4 is a compound represented by the chemical formula $Li_2Fe_{(1-x)}M_xP_{(2-y)}A_yO_7$, wherein M is at least any one or more metals of Ti, V, Cr, Ni, and Co, A is any one element of B, C, Al, Si, Ga, and Ge, $0<x\leq1$, and $0\leq y\leq0.07$. This cathode active material is expected to have a higher potential (vs $Li/Li^+$) than the metallic lithium potential due to multi-electron reactions based on the simulation. The all-solid-state battery according to an embodiment of the present disclosure uses this compound as a cathode active material (hereinafter sometimes referred to as the cathode active material of the embodiment).

However, as described above, the all-solid-state battery is not established with only the cathode. In view of this, the present inventor earnestly made studies on the anode for the all-solid-state battery using the cathode active material of the embodiment over and over again. As a result, the present inventor succeeded in obtaining an all-solid-state battery having a high energy density by using an anatase titanium oxide represented by the chemical formula $TiO_2$ as an anode active material while using the cathode active material of the embodiment. The present disclosure has been made as a result of such a process.

Embodiments

Embodiments of the present disclosure will be described below with reference to the attached drawings. Note that in the drawings used for the following description, the same or similar parts are denoted by the same reference signs, and repetitive descriptions are omitted, in some cases. For some drawings, unnecessary reference signs are omitted in the descriptions, in some cases.

FIG. 1 is a view showing the structure of an all-solid-state battery 1a according to an embodiment of the present disclosure. FIG. 1 is a vertical cross-sectional view obtained by cutting the all-solid-state battery 1a along a plane containing the stacking direction of the layers (2 to 4) in a stacked electrode body 10. Then, with the stacking direction being defined as an up-down direction, a cathode layer 2 is stacked above an electrolyte layer 4, the stacked electrode body 10 of the all-solid-state battery 1a has a structure in which the cathode layer 2, the electrolyte layer 4, and an anode layer 3 are stacked in this order from the upper side to the lower side, and a cathode current collector 5 and an anode current collector 6 each made of a metal foil are formed on the upper face of the cathode layer 2 and the lower face of the anode layer 3, respectively.

In the all-solid-state battery 1a according to an embodiment of the present disclosure, the cathode layer contains the above-described cathode active material of the embodiment and the anode layer contains an anode active material made of anatase titanium oxide (hereinafter, $TiO_2$). In addition, LAGP is used for the solid electrolyte. To evaluate the characteristics of the all-solid-state battery 1a according to the embodiment, various all-solid-state batteries using different anode active materials while using the cathode active material of the embodiment with different compositions, as well as an all-solid-state battery using $LiCoPO_4$ as the cathode active material and $TiO_2$ as the anode active material were prepared as samples, and the charging capacity and the discharging capacity of each sample were measured.

Procedure for Preparing Samples

In the all-solid-state battery 1a according to the embodiment, the cathode active material and the anode active material can be prepared by, for example, a solid-phase method. The solid electrolyte can be prepared by a solid-phase method or a glass melting method. Note that, as the anode active material, one provided as a commercial product can be used. The all-solid-state battery 1a according to the embodiment can be prepared using, for example, a green sheet method. Hereinafter, the procedures for preparing the LAGP, the cathode active material, and the all-solid-state battery will be described.

Procedure for Preparing LAGP

Figure 2:
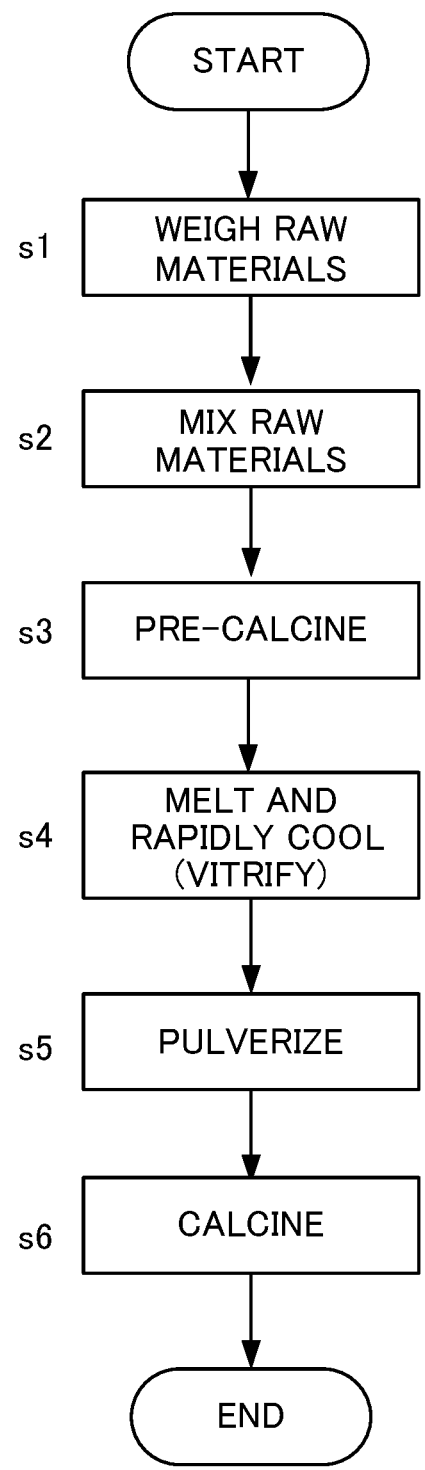
FIG. 2 is a flowchart showing a procedure for preparing an LAGP glass used in preparing the all-solid-state battery according to the embodiment.

The all-solid-state battery 1a according to the embodiment uses a LAGP as the solid electrolyte. The LAGP can be prepared by, for example, a glass melting method. FIG. 2 shows an example of the procedure for preparing LAGP using the glass melting method. First, powders of $Li_2CO_3$, $Al_2O_3$, $GeO_2$, and $NH_4H_2PO_4$ are used as raw materials, and these raw materials are weighted and mixed using a ball mill (s1, s2). Subsequently, the mixture is put into an alumina crucible or the like and is pre-calcined at a temperature of 300° C. to 400° C. over a period of 3 h to 5 h (s3). The pre-calcined powder obtained in the pre-calcining step (s3) is thermally treated at a temperature of 1200° C. to 1400° C. for 1 h to 2 h to melt the pre-calcined powder, and the melted sample is rapidly cooled down to be vitrified (s4). In this way, an amorphous LAGP powder is obtained. In addition, the amorphous LAGP powder obtained in the vitrifying step (s4) is pulverized using a ball mill or the like (s5), and the amorphous LAGP powder after pulverization is calcined under conditions of, for example, 600° C. and 5 h or more to obtain a crystallized LAGP powder (s6). These amorphous or crystallized LAGPs are used to prepare all-solid-state batteries.

Procedure for Preparing Cathode Active Material

Next, the procedure for preparing a cathode active material and an anode active material will be given. Here, the procedure for preparing a cathode active material made of a lithium cobalt pyrophosphate represented by the chemical formula $Li_2CoP_{(2-y)}A_yO_7$ wherein y=0.03 or y=0.07 and part of P is substituted with Si or Al and the procedure for preparing $Li_2CoP_2O_7$ in the chemical formula of which y is set such that y=0 will be described separately.

First, the procedure for preparing a lithium cobalt pyrophosphate in which part of P is substituted with Si or Al will be described. First, $NH_4H_2PO_4$, $Li_2CO_3$, CoO, and $SiO_2$ or $\gamma$-$Al_2O_3$ to be used for substituting P with Si or Al are weighted as raw materials. At this time, the contents of $NH_4H_2PO_4$ and $SiO_2$ or $\gamma$-$Al_2O_3$ are adjusted depending on the value of y in the chemical formula. Here, the contents were adjusted such that y=0.03 or y=0.07.

Next, the weighted raw material for the cathode active material are mixed and pulverized in an agate mortar or the like. Then, this mixture is heated at a temperature of 625° C. for 4 hours in ambient atmosphere to conduct calcination. Here, gas of the atmospheric composition is caused to flow in a calcining furnace and the sample powder is calcined to generate $Li_2CoP_{(2-y)}Si_yO_7$ or $Li_2CoP_{(2-y)}Al_yO_7$. In addition, the sintered product is pulverized in an agate mortar to be made into a powder having a predetermined average particle size (for example, 7 μm), and thereafter, the pulverized sample is further pulverized with a ball mill using an alcohol medium. In this way, a powder of $Li_2CoP_{(2-y)}Si_yO_7$ or $Li_2CoP_{(2-y)}Al_yO_7$ adjusted to have a predetermined average particle size (for example, 1 μm) is obtained. Then, this powder was used as the cathode active material to be contained in the cathode layer material.

Next, the procedure for preparing $Li_2CoP_2O_7$ will be described. Here, the procedure for preparing $Li_2CoP_2O_7$ using $NH_4H_2PO_4$, $LiNO_3$, $Co(NO_3)_2 \cdot 6H_2O$, citric acid, and pure water as raw materials will be given. First, the raw materials are weighted. The weighting was adjusted such that among the raw materials of $Li_2CoP_2O_7$, only Li was excessive relative to the stoichiometric proportion. Subsequently, the raw materials were mixed in a beaker, and thereafter, the beaker was placed on a hot plate and pure water in the raw materials was evaporated. Moreover, the mixture of the raw materials in the beaker was further dried using a vacuum dryer to make a powder of the mixture of the raw material, and the powder mixture was pulverized in an agate mortar. Then, the mixture after pulverization was heated at a temperature of 625° C. for 4 hours in an ambient atmosphere to conduct calcination. Here gas of atmospheric composition was not caused to flow in the calcining furnace and the sample powder was calcined to generate $Li_2CoP_2O_7$. In addition, the sintered product was pulverized using the agate mortar to be made into a powder having a predetermined average particle size (for example, 7 μm), and thereafter, the pulverized sample was further pulverized with the ball mill using the alcohol medium. In this way, a powder of $Li_2CoP_2O_7$ adjusted to have a predetermined average particle size (for example, 1 μm) was obtained. Note that $LiCoPO_4$, which was the cathode active material of Sample 2, can be prepared, for example, in the same manner as in the above-described procedure for preparing $Li_2CoP_2O_7$ except that $CH_3COOLi$, $CO(NO_3)_2·6H_2O$, $NH_4H_2PO_4$, citric acid, and pure water are used as raw materials.

Procedure for Preparing All-Solid-State Battery

Figure 3:
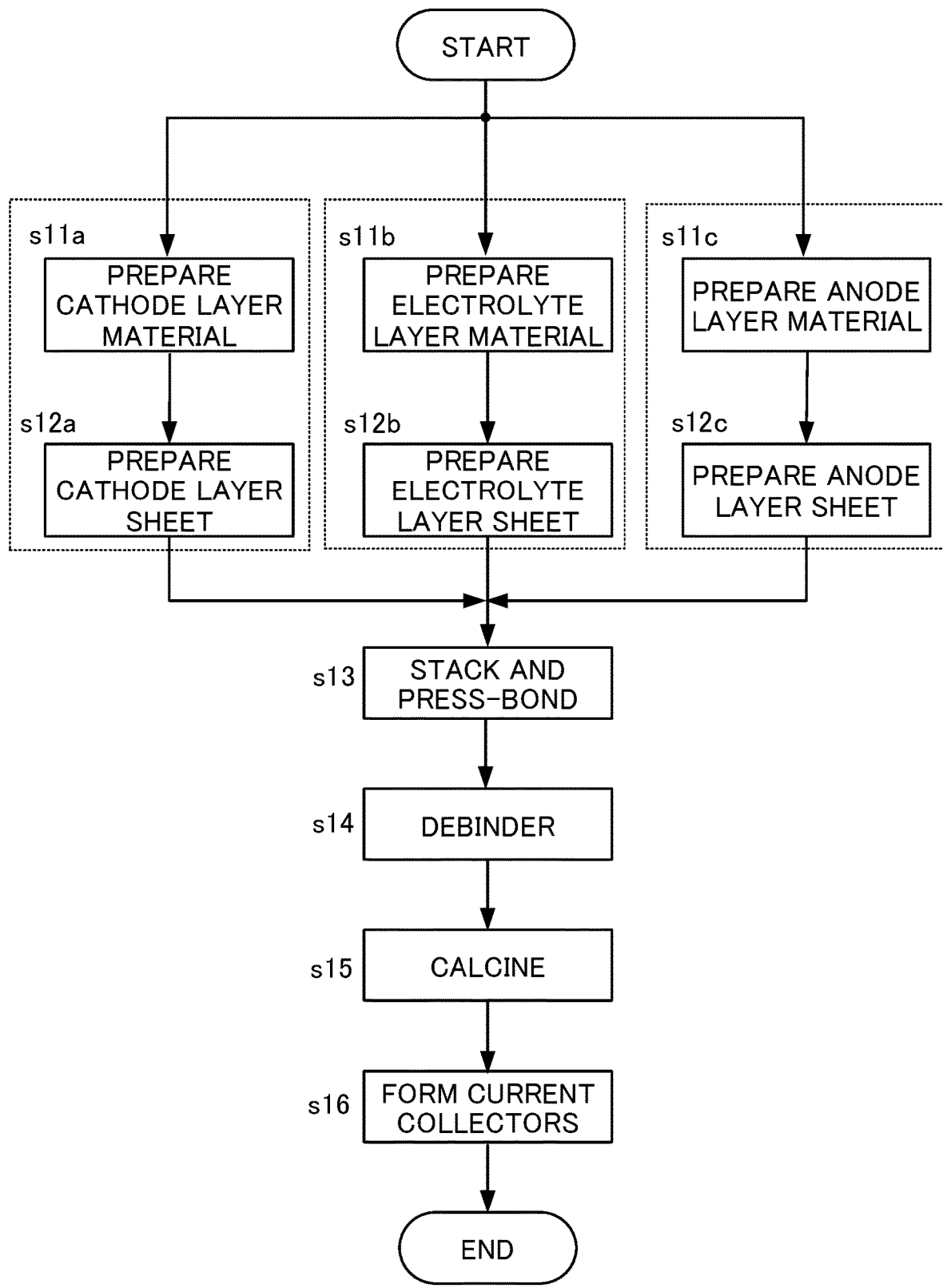
FIG. 3 is a flowchart showing a procedure for manufacturing the all-solid-state battery according to the embodiment.

FIG. 3 shows the procedure for preparing the all-solid-state battery 1a. First, the cathode layer sheet, the anode layer sheet, and the electrolyte layer sheet included in the stacked electrode body 10 are prepared (s11a, s12a, s11b, s12b, s11c, s12c). Regarding the cathode layer sheet, the slurry electrode layer material containing the cathode active material, the amorphous or crystalline LAGP, the conductive agent, the binder, and the plasticizer is molded into a sheet shape by the above-described doctor blade method. Regarding the anode layer sheet as well, the slurry electrode layer material containing the anode active material, the amorphous or crystalline LAGP, the conductive agent, the binder, the plasticizer is molded into a sheet shape by the above-described doctor blade method.

For the paste cathode layer material and the anode layer material (hereinafter sometimes collectively referred to as electrode layer materials), which are the materials for the cathode layer sheet and the anode layer sheet (hereinafter sometimes collectively referred to as electrode layer sheets), a ceramic powder is obtained, for example, by mixing the amorphous LAGP powder and the electrode active material corresponding to the cathode or anode in a mass ratio of 50:50. The binder is added, for example, in an amount of 20 wt % to 30 wt % to the ceramic powder. Subsequently, a mixture obtained by adding an absolute alcohol such as ethanol as a solvent in an amount of 30 wt % to 50 wt % to the ceramic powder is mixed, for example, for 20 h with a ball mill or the like. In this way, the slurry electrode layer material is obtained. Note that, the cathode layer and the anode layer (hereinafter sometimes collectively referred to as electrode layers) is added with a conductive agent made of a carbon material or the like as necessary.

On the other hand, for the paste electrolyte layer material, which is a material of the electrolyte layer sheet, an amorphous or crystalline LAGP powder is used as a ceramic powder. Then, a mixture obtained by adding the binder, for example, in an amount of 20 wt % to 30 wt % to the ceramic powder and adding an absolute alcohol such as ethanol as a solvent in an amount of 30 wt % to 50 wt % to the ceramic powder is mixed, for example, for 20 h with a ball mill or the like to prepare the paste electrolyte layer material.

Each of the paste electrode layer materials and the electrolyte layer material is degassed in vacuum, and is then applied onto a PET film by the doctor blade method to obtain sheet-shaped electrode layer materials respectively corresponding to the cathode layer and the anode layer and a sheet-shaped electrolyte layer material corresponding to the electrolyte layer. Moreover, in order to adjust the sheet of each layer to a target thickness, a plurality of sheet-shaped materials each obtained by one application are stacked, and press-bonded. The press-bonded body is cut into a predetermined flat-surface size to complete the electrode layer sheets respectively corresponding to the cathode layer and the anode layer and the electrolyte layer sheet, which are green sheets.

Next, a stacked body is prepared by press-bonding what is obtained by holding the electrolyte layer sheet between the cathode layer sheet and the anode layer sheet (s13). Then, the stacked body is subjected to a debindering step (s14). In this debindering step (s14), the binder is thermally decomposed. Note that the debindering step is conducted at a temperature of approximately 300-600° C. in the atmosphere in compliance with the decomposition temperature of the used binder. Here, since the softening point of LAGP is about 530° C., the debindering step (s14) is conducted at a temperature lower than the softening point, and the stacked body subjected to the debindering step (s14) is calcined at a temperature higher than that in the debindering step in a non-oxidizing atmosphere to obtain the stacked electrode body 10 (s15). Here, the calcination was conducted under conditions of 600° C. and 5 h. Then, thin films made of a metal such as gold were formed on the surfaces of the uppermost layer and the lowermost layer of the stacked electrode body 10 by sputtering or vapor deposition to form current collector (5, 6) (s16), so that the all-solid-state battery 1a was completed.

Evaluation of Properties

In order to evaluate the characteristics of the all-solid-state battery 1a according to the embodiment, charging and discharging were conducted on the all-solid-state battery 1a prepared in the above-described procedures. Specifically, all-solid-state batteries were prepared as samples using 6 cathode active materials of $LiCoPO_4$, $Li_2CoP_2O_7$, $Li_2CoP_{1.97}Si_{0.03}O_7$, $Li_2CoP_{1.93}Si_{0.07}O_7$, $Li_2CoP_{1.97}Al_{0.03}O_7$, and $Li_2CoP_{1.93}Al_{0.07}O_7$, an anode active material of any one of $TiO_2$, $Li_3V_2(PO_4)_3$, and $Li_4Ti_5O_{12}$, and a solid electrolyte made of LAGP.

Table 1 shows combinations of the cathode active materials and the anode active materials of the prepared samples.

TABLE 1

| SAMPLE | CATHODE | ANODE |
| --- | --- | --- |
| 1 | $Li_2CoP_2O_7$ | $TiO_2$ |
| 2 | $LiCoPO_4$ | $TiO_2$ |
| 3 | $Li_2CoP_{1.97}OSi_{0.03}O_7$ | $TiO_2$ |
| 4 | $Li_2CoP_{1.93}OSi_{0.07}O_7$ | $TiO_2$ |
| 5 | $Li_2CoP_2O_7$ | $Li_3V_2(PO_4)_3$ |
| 6 | $Li_2CoP_{1.97}OSi_{0.03}O_7$ | $Li_3V_2(PO_4)_3$ |
| 7 | $Li_2CoP_{1.93}OSi_{0.07}O_7$ | $Li_3V_2(PO_4)_3$ |
| 8 | $Li_2CoP_2O_7$ | $Li_4Ti_5O_{12}$ |
| 9 | $Li_2CoP_{1.97}OSi_{0.03}O_7$ | $Li_4Ti_5O_{12}$ |
| 10 | $Li_2CoP_{1.93}OSi_{0.07}O_7$ | $Li_4Ti_5O_{12}$ |
| 11 | $Li_2CoP_{1.97}OAl_{0.03}O_7$ | $TiO_2$ |
| 12 | $Li_2CoP_{1.93}OAl_{0.07}O_7$ | $TiO_2$ |
| 13 | $Li_2CoP_{1.97}OAl_{0.03}O_7$ | $Li_3V_2(PO_4)_3$ |
| 14 | $Li_2CoP_{1.93}OAl_{0.07}O_7$ | $Li_3V_2(PO_4)_3$ |
| 15 | $Li_2CoP_{1.97}OAl_{0.03}O_7$ | $Li_4Ti_5O_{12}$ |
| 16 | $Li_2CoP_{1.93}OAl_{0.07}O_7$ | $Li_4Ti_5O_{12}$ |

As shown in Table 1, the cathode active materials of Samples 1, 3 to 16 were the cathode active materials of the embodiment, and were compounds of the chemical formula $Li_2Fe_{(1-x)}M_xP_{(2-y)}A_yO_7$, wherein x=1 and the value of y is any one of y=0, y=0.03, and y=0.07, and in the case of y≠0, A was Si or Al. The anode active material was any one of $TiO_2$, $Li_3V_2(PO_4)_3$, and $Li_4Ti_5O_{12}$. The cathode active material and the anode active material of Sample 2 were $LiCoPO_4$ and $TiO_2$, respectively.

In Table 1, Samples 1, 3, 4, 11, and 12 correspond to the all-solid-state battery 1a according to the embodiment. Regarding Sample 2, the anode active material was $TiO_2$, which is the same as that of the all-solid-state battery 1a according to the embodiment, but the cathode active material was LCoPO$_4$. Samples 5 to 10 and Samples 13 to 16 are all-solid-state batteries prepared using the cathode active material of the embodiment and the anode active material of Li$_3$V$_2$(PO$_4$)$_3$ or Li$_4$Ti$_5$O$_{12}$.

Charge and Discharge Test

A charge and discharge test which charged and then discharged each sample shown in Table 1 was conducted to measure the charging capacity and the discharging capacity, and the relation between the charging capacity and the voltage and the relation between the discharging capacity and the voltage were examined. Note that on Samples other than Sample 2, a charge and discharge test in which constant current charge was conducted at a rate of 1/20 C until the battery voltage reached 4.3 V at room temperature and constant current discharge was conducted at a rate of 1/20 C until the battery voltage reached the final voltage 1.5 V at room temperature was conducted. On Sample 2, a charge and discharge test in which constant current charge was conducted at a rate of 1/20 C until the battery voltage reached 3.3 V at room temperature and constant current discharge was conducted at a rate of 1/20 C until the battery voltage reached the final voltage 1.1 V at room temperature was conducted.

Figure 4:
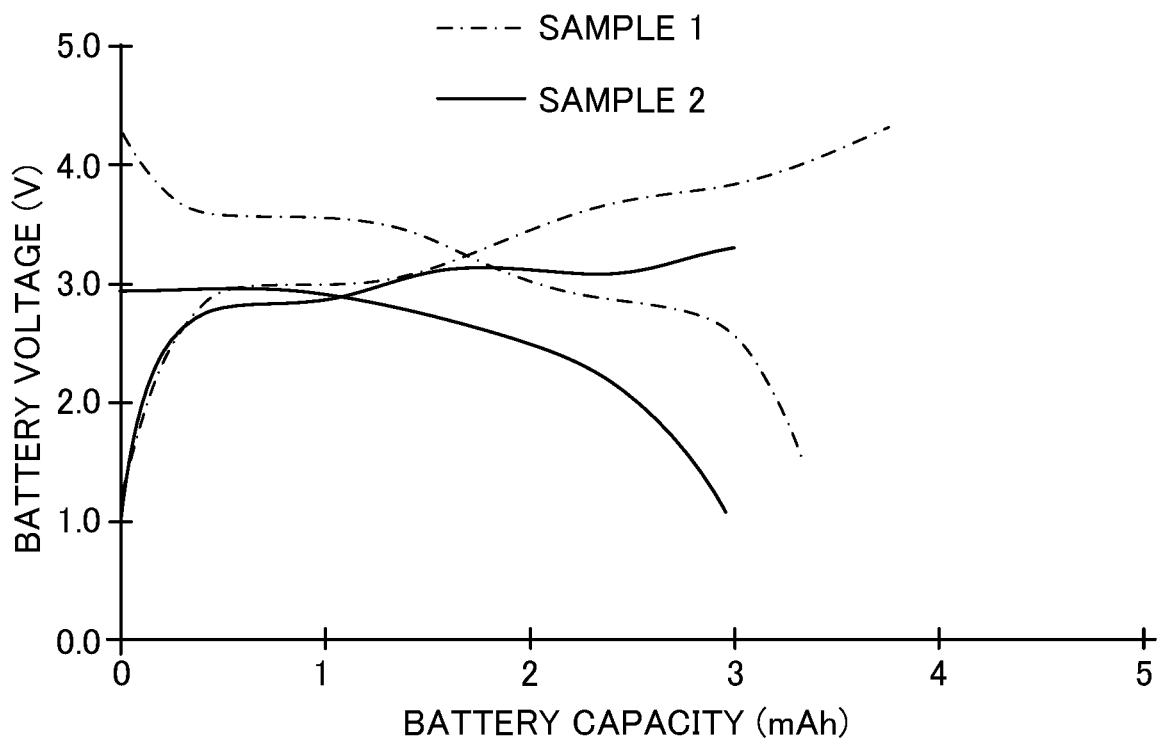
FIG. 4 is a graph showing charge and discharge characteristics of the all-solid-state battery according to the embodiment.

First, the charge and discharge characteristics of Sample 1 and the charge and discharge characteristics of Sample 2 having the same configuration as of Sample 1 except that the cathode active material was LiCoPO$_4$ were compared. Sample 2 was such that elements contained in the cathode active material were Li, Co, P, and O and the types of elements contained in the composition are the same as of Sample 1. Moreover, the anode active material was TiO$_2$, which was the same as in Sample 1. FIG. 4 shows the charge and discharge characteristics of Sample 1 and Sample 2. As shown in FIG. 4, while Sample 1 exhibited a capacity of 3.3 mAh at an average discharge voltage of 3.0 V, Sample 2 exhibited a capacity of 2.9 mAh at an average discharge voltage of 2.8 V. That is, Sample 1 had an energy density improved by approximately 22% as compared with the comparative example.

Note that the simulation using the first principle calculation has revealed that the cathode active material represented by the chemical formula Li$_2$Fe$_{(1-x)}$Co$_x$P$_2$O$_7$, which encompasses Li$_2$CoP$_2$O$_7$, is caused to have an energy density greater than 791 mWh/g by setting the value of x in the chemical formula to 0.8≤x≤1. In addition, this energy density greater than 791 mWh/g is approximately 1.5 times the energy density of well-known lithium iron phosphate (LiFePO$_4$), which has recently been attracting attention as a cathode active material for all-solid-state batteries. Specifically, LiFePO$_4$ has a capacity density of about 160 mAh/g at an average operating voltage of 3.4 V (vs Li/Li$^+$) and exhibits an energy density of about 540 Wh/g. When x in the above-described chemical formula is set to x=0.8, the energy density becomes about 791 mWh/g, and this energy density is 1.46 times the energy density of LiFePO$_4$. Note that when x=1, the energy density becomes about 891 mWh/g. In addition, LiCoPO$_4$, which is the cathode active material of Sample 2, theoretically has a capacity density of 167 mAh/g at an average operating voltage of 4.8 V. That is, LiCoPO$_4$ theoretically has an energy density of 801 mWh/g. Note that Sample 1 and Sample 2 are different only in the cathode active materials, and theoretically, Sample 1 has an energy density approximately 11% higher than that of the comparative example. However, Sample 1 had an energy density 25% superior to that of the comparative example.

Figure 5A:
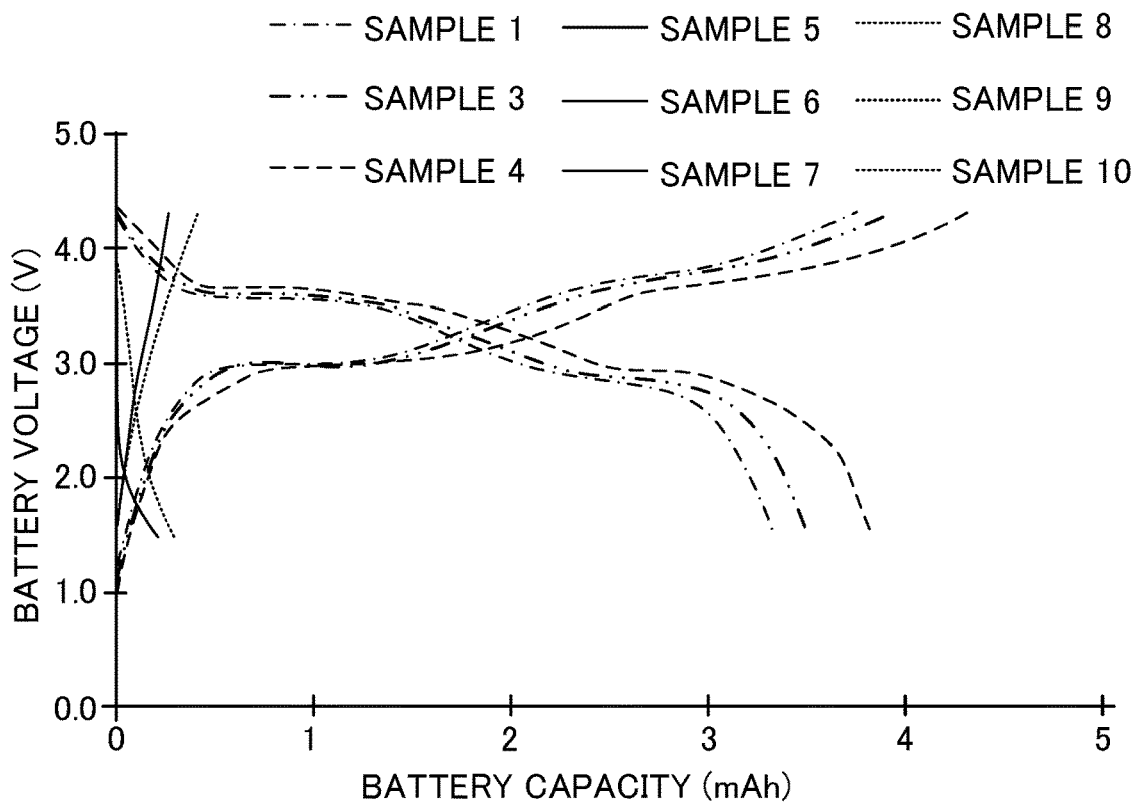
FIG. 5A is a graph showing charge and discharge characteristics of the all-solid-state battery according to the embodiment.
Figure 5B:
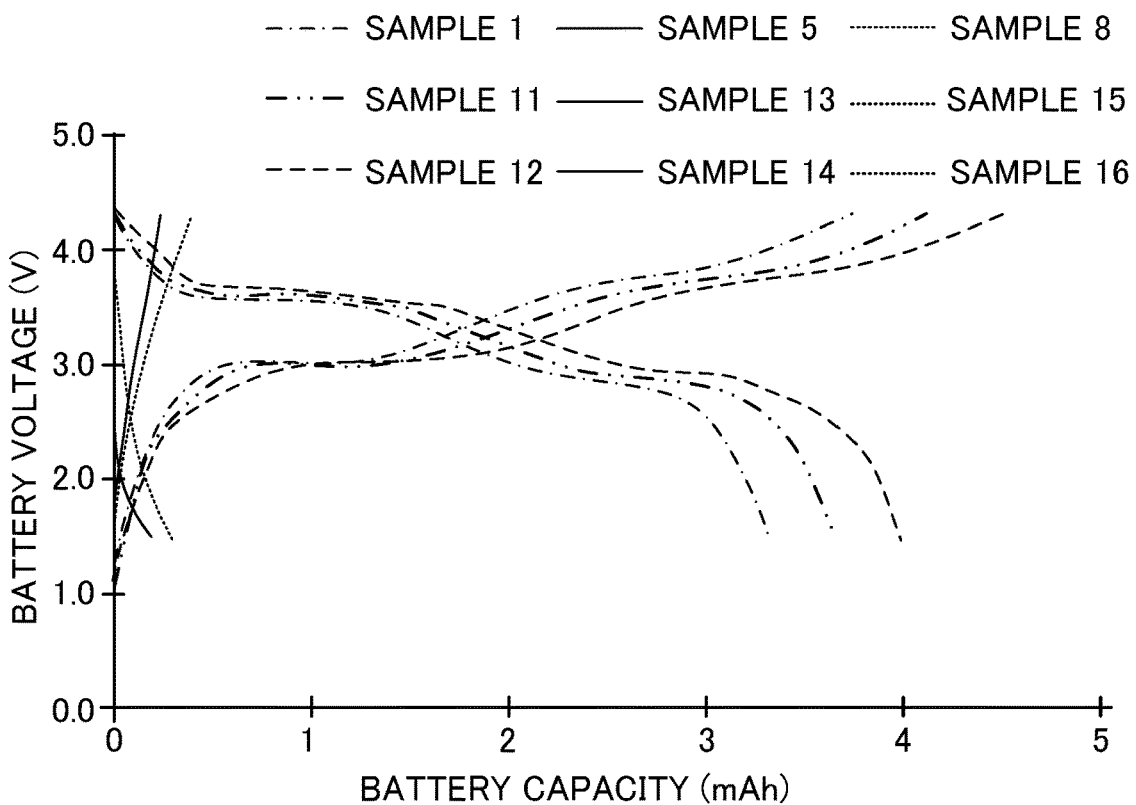
FIG. 5B is a graph showing charge and discharge characteristics of the all-solid-state battery according to the embodiment.

FIG. 5A and FIG. 5B show the charge and discharge characteristics of Samples 1, 3, 4, 11, and 12 corresponding to the all-solid-state battery 1a according to the embodiment and the charge and discharge characteristics of Samples 5 to 10 and 13 to 16 corresponding to all-solid-state batteries having different anode active materials from that of the all-solid-state battery 1a according to the embodiment. FIG. 5A shows the charge and discharge characteristics of the all-solid-state batteries in which the combinations of cathode active material and anode active material are Samples 1 and 3 to 10 in Table 1. In other words, FIG. 5A shows the charge and discharge characteristics of all-solid-state batteries 1a using a compound in which the element A to be substituted for P in Li$_2$CoP$_2$O$_7$ and Li$_2$CoP$_{(2-y)}$A$_y$O$_7$ is Si as the cathode active material. FIG. 5B shows the charge and discharge characteristics of Samples 1, 5, 8, and 11 to 16 in Table 1. In other words, FIG. 5B shows the charge and discharge characteristics of all-solid-state batteries 1a using a compound in which the element A to be substituted for P in Li$_2$CoP$_2$O$_7$ is Al as the cathode active material.

In FIG. 5A and FIG. 5B, the charge and discharge characteristics of Samples 5 to 7, 13, and 14 using Li$_3$V$_2$(PO$_4$)$_3$ as the anode active material are indicated by solid lines and the charge and discharge characteristics of Samples 8 to 10, 15, and 16 using Li$_4$Ti$_5$O$_{12}$ as the anode active material are indicated by dotted lines. Note that as the charge characteristic and the discharge characteristic are indicated as one characteristic curve by the dotted line or the solid line as shown in FIG. 5A and FIG. 5B, Samples 5 to 10 and 13 to 16 using Li$_3$V$_2$(PO$_4$)$_3$ or Li$_4$Ti$_5$O$_{12}$ as the anode active material exhibited such significantly similar charge and discharge characteristics that it was impossible to distinguish the characteristic curves of the respective Samples in FIGS. 5A and 5B regardless of the type of the cathode active material as long as the same anode active material was used. In addition, it was confirmed that Samples 1, 3, 4, 11, and 12 corresponding to the all-solid-state battery 1a according to the embodiment were apparently more superior in charge and discharge characteristics than Samples 5 to 10 and 13 to 16 using the same cathode active material as in the all-solid-state battery 1a according to the embodiment and anode active materials different from TiO$_2$.

Specifically, among Samples 1 to 3, 11, and 12 using TiO$_2$ as the anode active material, Sample 1 using Li$_2$CoP$_2$O$_7$ as the cathode active material exhibited a capacity of 3.3 mAh at an average discharge voltage of 3.0 V as described above. Sample 3 using Li$_2$CoP$_{1.97}$Si$_{0.03}$O$_7$ as the cathode active material, shown in FIG. 5A, exhibited a capacity of 3.65 mAh at an average discharge voltage of 3.03 V, and Sample 4 using Li$_2$CoP$_{1.93}$Si$_{0.07}$O$_7$ as the cathode active material exhibited a capacity of 3.99 mAh at an average discharge voltage of 3.05 V. Sample 11 using Li$_2$CoP$_{1.97}$Al$_{0.03}$O$_7$ as the cathode active material, shown in FIG. 5B, exhibited a capacity of 3.49 mAh at an average discharge voltage of 3.02 V, and Sample 12 using Li$_2$CoP$_{1.93}$Al$_{0.07}$O$_7$ as the cathode active material exhibited a capacity of 3.82 mAh at an average discharge voltage of 3.04 V.

Hence, it was confirmed that even when the same cathode active material as in the all-solid-state battery 1a according to the embodiment is used, if the anode is not TiO$_2$, excellent charge and discharge characteristics cannot be obtained. In addition, from the difference in charge and discharge characteristics between Sample 1 and Sample 2 shown in FIG. 4, it can be considered that the all-solid-state battery using Li$_2$CoP$_2$O$_7$ as the cathode active material and TiO$_2$ as the anode active material is more likely to achieve a performance as theoretically predicted. Moreover, as shown in FIG. 5A and FIG. 5B, the charge and discharge characteristics of Samples 3, 4, 11, and 12 using a compound obtained by substituting part of P in $Li_2CoP_2O_7$ with Si or Al as the cathode active material and $TiO_2$ for the anode were superior to the charge and discharge characteristics of Sample 1. Hence, it can be considered that the all-solid-state battery 1a according to the embodiment using a compound represented by the chemical formula $Li_2Fe_{(1-x)}Co_xP_{(2-y)}A_yO_7$ wherein $0 \leq x \leq 1$ and $0 \leq y \leq 0.07$ as the cathode active material and $TiO_2$ as the anode active material is likely to achieve performance as theoretically predicted. Then, the fact that it is likely to achieve the performance as theoretically predicted leads to facilitating the management of manufacturing conditions. In other words, it is expected that the all-solid-state battery 1a according to the embodiment is further improved in characteristics by studying the manufacturing conditions in more detail.

Other Embodiments

Figure 6A:
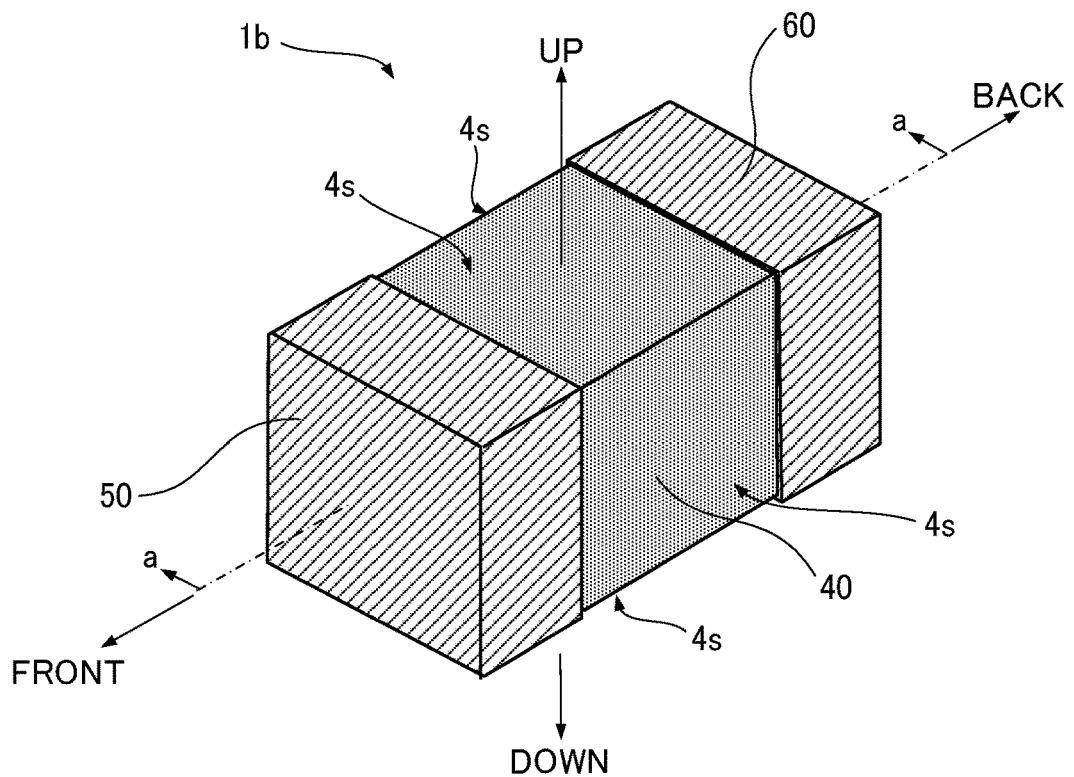
FIG. 6A is a view showing an all-solid-state battery according to another embodiment of the present disclosure.
Figure 6B:
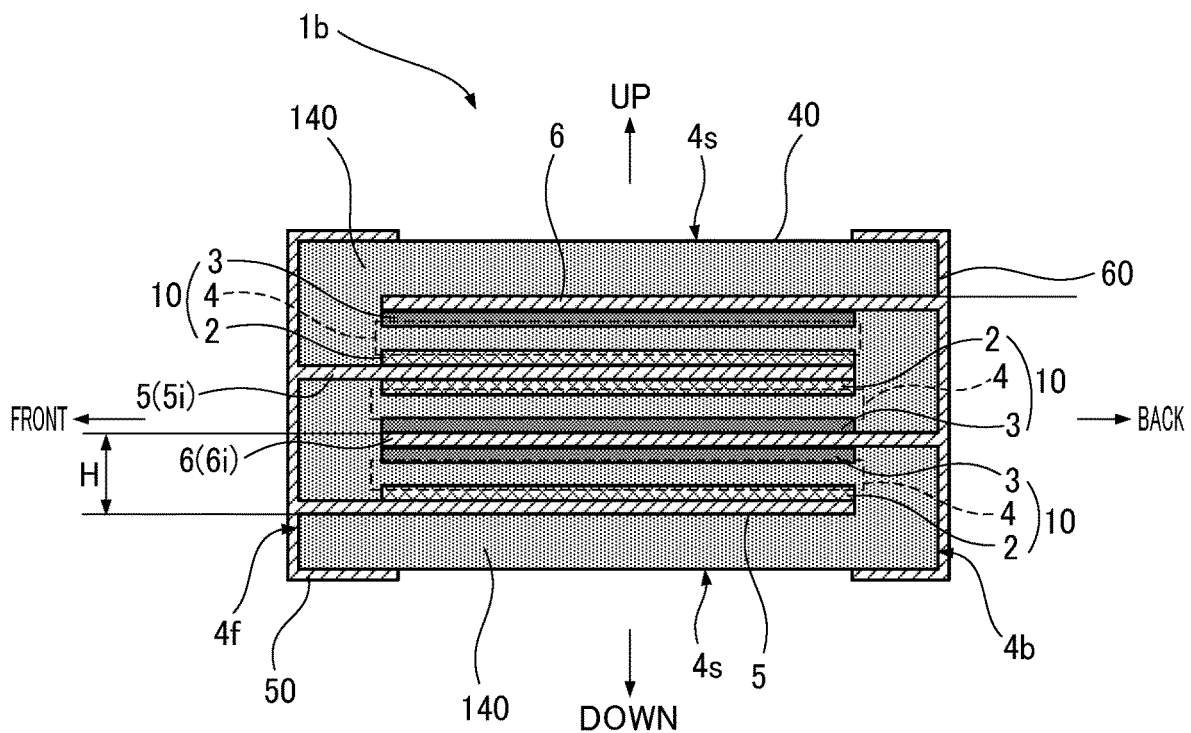
FIG. 6B is a view showing the all-solid-state battery according to the other embodiment of the present disclosure.

The all-solid-state battery 1a according to an embodiment of the present disclosure is not limited to the structure shown in FIG. 1 but may have a structure similar to a multilayer chip component, for example. In view of this, as another embodiment of the present disclosure, an all-solid-state battery (hereinafter, a chip battery) having a structure similar to a multilayer chip component will be given. FIG. 6A and FIG. 6B show an example of the chip battery 1b. FIG. 6A is a view showing an appearance of the chip battery 1b and FIG. 6B is a cross-sectional view in the direction of arrows a-a in FIG. 6A. Note that in FIG. 6A and FIG. 6B, the stacking direction of the layers (2, 3, 4) included in a stacked electrode body 10 is the up-down direction, and a certain direction orthogonal to the up-down direction is a front-back direction, as in FIG. 1. In addition, in FIG. 5A and FIG. 5B, constituent elements of the all-solid-state battery 1b are indicated by different hatchings.

As shown in FIG. 6A, the chip battery 1b includes: a cuboid-shaped battery main body 40; and a cathode terminal 50 and an anode terminal 60 provided as external electrodes on two opposite surfaces of the battery main body 40. Note that the battery main body 40 is an integral sintered body in which the stacked electrode body 10 is buried inside the battery main body 40 as shown in FIG. 6B.

Here, it is assumed that the direction in which the cathode terminal 50 and the anode terminal 60 face each other is defined as a front-back direction and the cathode terminal 50 is formed on the front side. The cathode terminal 50 is formed on a front end face 4f of the cuboid-shaped battery main body 40 and on a side face 4s of the battery main body 40 which continues to the front end face 4f, and the anode terminal 60 is formed on a back end face 4b of the battery main body 40 and on the side face 4s of the battery main body 40 which continues to the back end face 4b.

As described above, the battery main body 40 has a structure in which the stacked electrode body 10 is buried in the solid electrolyte 140. Note that the battery main body 40 of the chip battery 1b shown here has a structure in which three stacked electrode bodies 10 are buried in the solid electrolyte 140 while being stacked via current collectors (5, 6) in the up-down direction. In addition, in this chip battery 1b, the all-solid-state battery in which one stacked electrode body 10 is provided with the cathode and anode current collectors (5, 6) is defined as one unit cell, and three unit cells are buried in the battery main body 40 while stacked in the up-down direction such that these unit cells are coupled in parallel. For this reason, on the upper face and the lower face of the current collectors (5i, 6i) in the inner layer, layers of the same polarity (2, 3) are stacked, and the cathode current collector 5 and the anode current collector 6 of each unit cell are coupled respectively to the cathode terminal 50 and the anode terminal 60. Note that in the prepared chip battery 1b, the thickness H of each unit cell in the up-down direction is 0.47 mm, and the thicknesses of the cathode layer 2, the anode layer 3, the electrolyte layer 4, and the current collector layers (5, 6) in the up-down direction are 0.09 mm, 0.10 mm, 0.08 mm, and 0.1 mm, respectively, so that the battery main body 40 is very thin even though three unit cells are stacked. The chip battery 1b can be mounted on a circuit board by a method like reflow soldering as in the case of other electronic components included in an electronic circuit.

The chip battery 1b shown in FIG. 6A and FIG. 6B can be prepared in a method similar to that for a multilayer chip component, for example. That is, a manufacturing procedure based on the doctor blade method and the screen printing method can be employed. In addition, the chip batteries 1b are not individually prepared one by one. First, the battery main body 40 before calcination was counted as an individual piece, and a sheet in which a large number of individual pieces are arranged on a plane normal to the up-down direction is prepared. Subsequently, the sheet is cut and separated into each individual piece, and each individual piece is calcined to obtain the battery main body 40, which is a sintered body. Then, the cathode terminal 50 and the anode terminal 60 are formed on the front and back end faces and the side face continuing to the front and back end faces of the battery main body 40 to complete the chip battery 1b. Note that for the cathode layer 2 and the anode layer 3 buried in the battery main body 40 as well as the solid electrolyte 140 surrounding the electrolyte layer 4 and the stacked electrode body 10, the paste cathode layer material, anode layer material, and electrolyte layer material used in the green sheet method can be used. In addition, for the current collector, a conductor paste such as a silver paste can be used.

Figure 7:
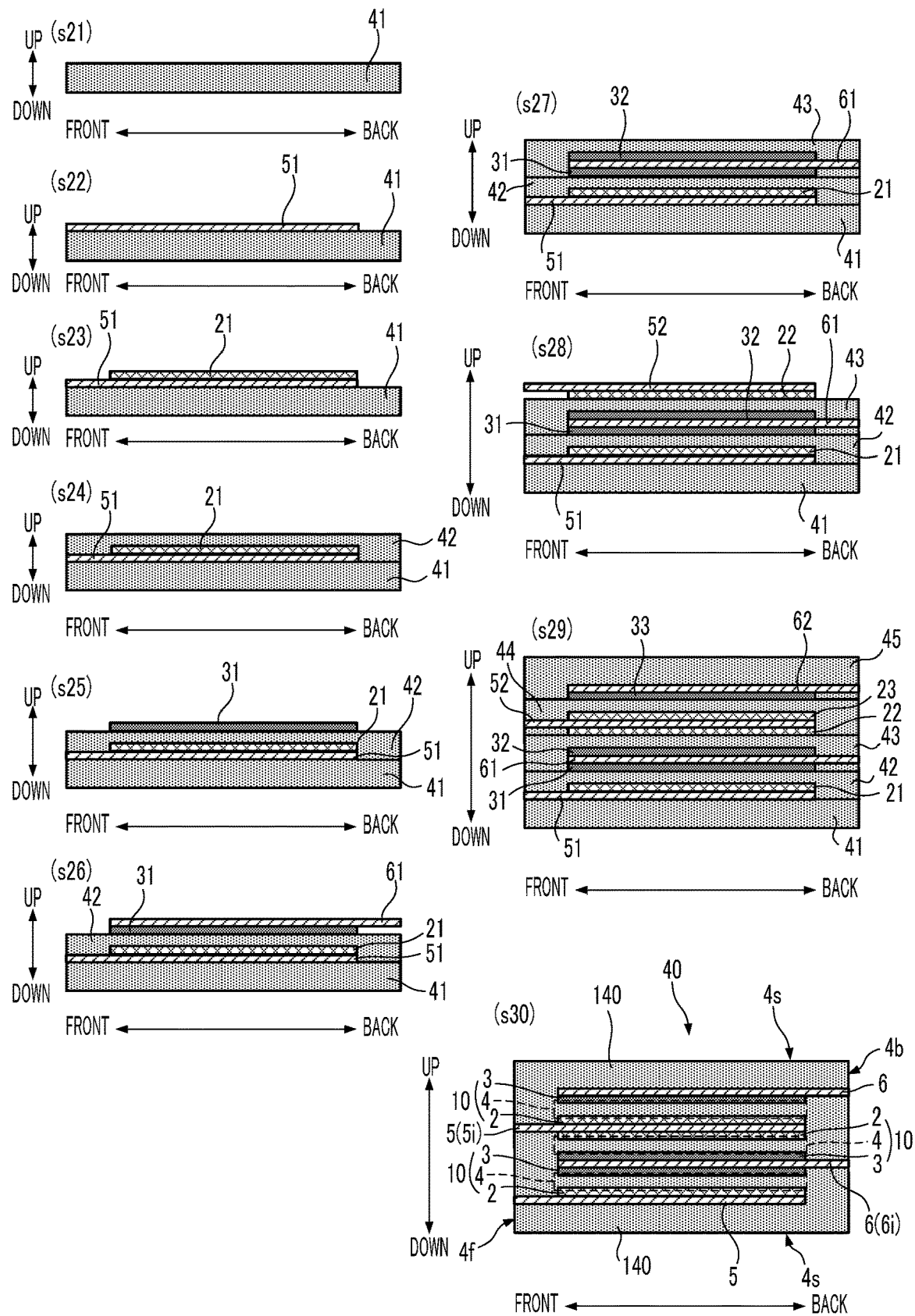
FIG. 7 is a view showing a procedure for preparing the all-solid-state battery according to the other embodiment.

FIG. 7 shows an example of the procedure for preparing the all-solid-state battery 1b shown in FIG. 6A and FIG. 6B. Note that FIG. 7 shows the procedure for applying, by the doctor blade method, or selectively forming, by the screen printing method, patterns of the cathode layer material, the electrolyte layer material, the anode layer material, and the conductor paste respectively corresponding to the cathode layer 2, the electrolyte layer 4, the anode layer 3, and the current collectors (5, 6) included in the stacked electrode body 10 in the flat region (hereinafter sometimes referred to as an individual region) corresponding to each individual piece. Hereinafter, the procedure for preparing the all-solid-state battery 1b will be described with reference to FIG. 6B and FIG. 7.

First, an electrolyte layer material 41 is applied (s21), and a conductor paste pattern 51 to be a current collector is formed on the electrolyte layer material 41 by the screen printing method (s22). Here, a silver paste was used. Subsequently, an electrode layer material pattern 21 to be the cathode layer or the anode layer is formed on the conductor paste pattern 51 (s23). Here, patterns (51, 21) corresponding to the cathode current collector 5 and the cathode layer 2 are formed. Note that the cathode layer material pattern 21 is formed in a rectangular shape at the center of the individual region, and the conductor paste pattern 51 to be the cathode current collector 5 is formed to reach the front end of the individual region while covering the region where the cathode layer material pattern 21 has been formed.

Once the cathode layer material pattern 21 is formed, an electrolyte layer material 42 is applied onto the entire individual region while covering this cathode layer material pattern 21 (s24), and an anode layer material pattern 31 and a conductor paste pattern 61 to be the anode current collector 6 are formed in this order above the electrolyte layer material 42 (s25, s26). In this way, a stacked structure corresponding to the first unit cell is formed. Note that the anode layer material is formed in a rectangular shape at the center of the individual region like the cathode layer material, and the conductor paste pattern 61 to be the anode current collector 6 is formed to reach the back end of the individual region while covering the region where the anode layer material pattern 31 has been formed.

Next, a stacked structure to be the second unit cell is formed above the stacked structure to be the first unit cell. Here, an anode layer material pattern 32 is formed on the conductor paste pattern 61 corresponding to the anode current collector 6 of the first unit cell, and the anode layer material pattern 32 is covered with an electrolyte layer material 43 (s27).

Moreover, a cathode layer material pattern 22 and a conductor paste pattern 52 to be the cathode current collector 5 are formed in this order (s28) to complete a stacked structure corresponding to the second unit cell. Then, a cathode layer material pattern 23 is formed on the conductor paste pattern 52 corresponding to the cathode current collector 5 of the second unit cell, and an electrolyte layer material 44 is applied from above the pattern 23, and moreover, an anode layer material pattern 33 and a conductor paste pattern 62 are formed to complete a stacked structure corresponding to the third unit cell. Then the part above the conductor paste pattern 62 corresponding to the anode current collector 6 in the third unit cell is covered with an electrolyte layer material 45 (s29). In this way, the stacked structures corresponding to the three unit cells coupled to one another in parallel are formed in such a manner as to be buried in the electrolyte layer materials (41 to 45). As described above, a sheet in which many stacked structures corresponding to the three unit cells coupled in parallel are formed in each individual piece in the flat planes is prepared. Note that in the above-described steps (s21 to s29), a drying step with thermal treatment is conducted after each of the steps of forming the patterns of materials (21 to 23, 31 to 33, 51, 52, 61, and 62) corresponding to the electrode layers (2, 3) and the current collectors (5, 6) of the stacked electrode body 10 and after each of the steps of applying the electrolyte layer materials (41 to 45) corresponding to the solid electrolytes 140 to surround the electrolyte layer 4 and the stacked electrode body 10.

Next, the sheet is cut. In this way, the sheet is separated into cuboid-shaped individual pieces. After each individual piece is calcined, the battery main body 40 formed of the cuboid-shaped sintered body is completed (s30). Then, the conductor paste is applied onto the front end face 4*f* and the back end face 4*b* of the battery main body 40 as well as the side face 4*s* of the battery main body 40, continuing to these end faces (4*f*, 4*b*), and the conductor paste is baked by thermal treatment, so that the cathode terminal 50 and anode terminal 60 are formed, and the all-solid-state battery 1*b* shown in FIG. 5A and FIG. 5B is completed.

Figure 8:
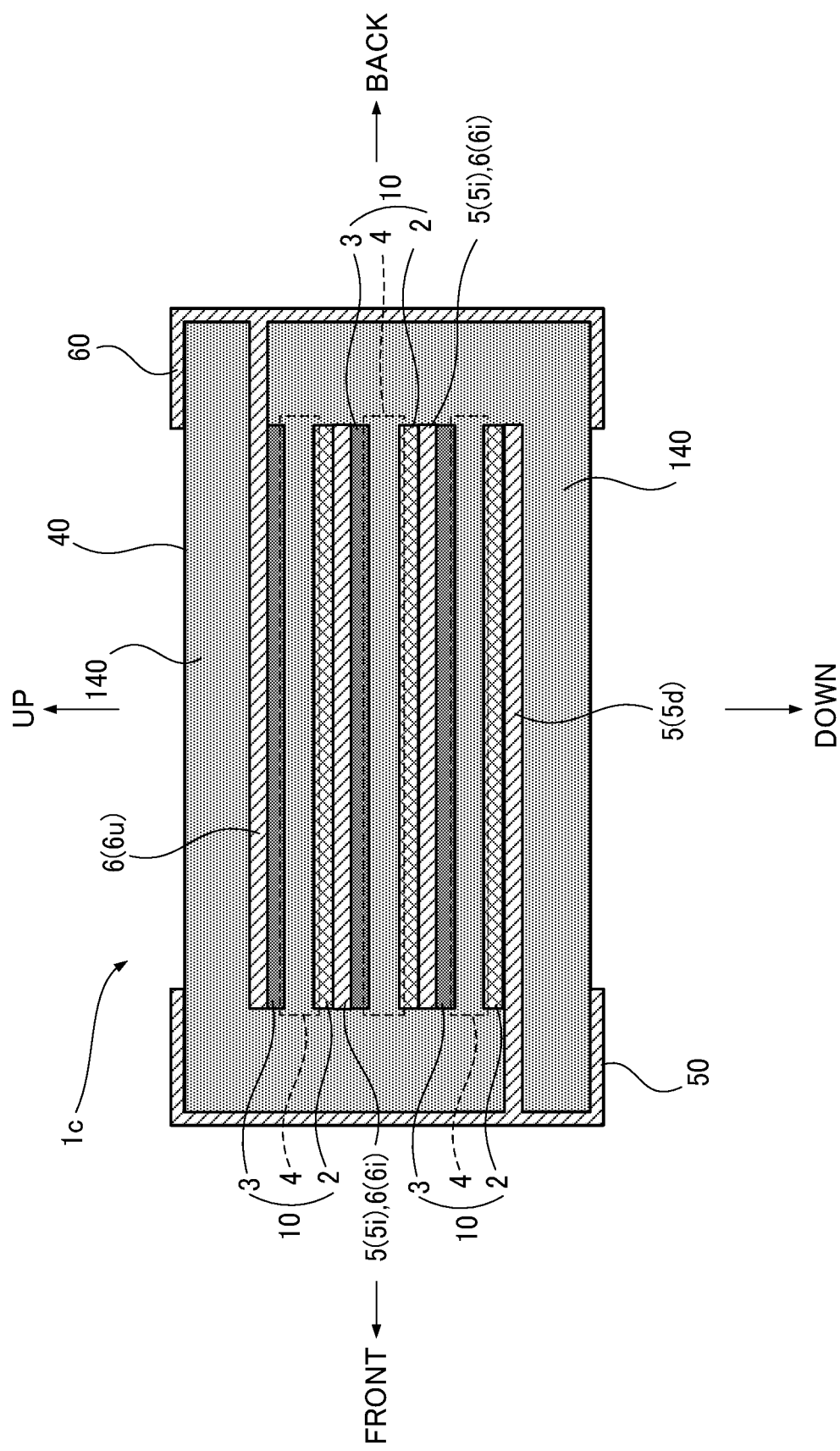
FIG. 8 is a view showing a modification of the all-solid-state battery according to the other embodiment.

Note that the coupling between the unit cells in the chip battery is not limited to the parallel coupling. For example, in a chip battery 1*c* shown in FIG. 8, three unit cells are coupled in series. Hence, electrode layers having different polarizations (2, 3) are formed on the upper face and the lower face of current collectors (5*i*, 6*i*) on the inner layer side of the stacked structure. That is, the current collectors (5*i*, 6*i*) on the inner layer side also serve as a cathode current collector 5 and an anode current collector 6. In addition, a current collector 5*d* of the lowermost layer and a current collector 6*d* of the uppermost layer are coupled respectively to a cathode terminal 50 on the front end face 4*f* side and an anode terminal 60 on the back end face 4*b* side of the battery main body 40, and the current collectors (5*i*, 6*i*) on the inner layer side are only in the region where the cathode layer 2 and the anode layer 3 are formed.

Figure 9:
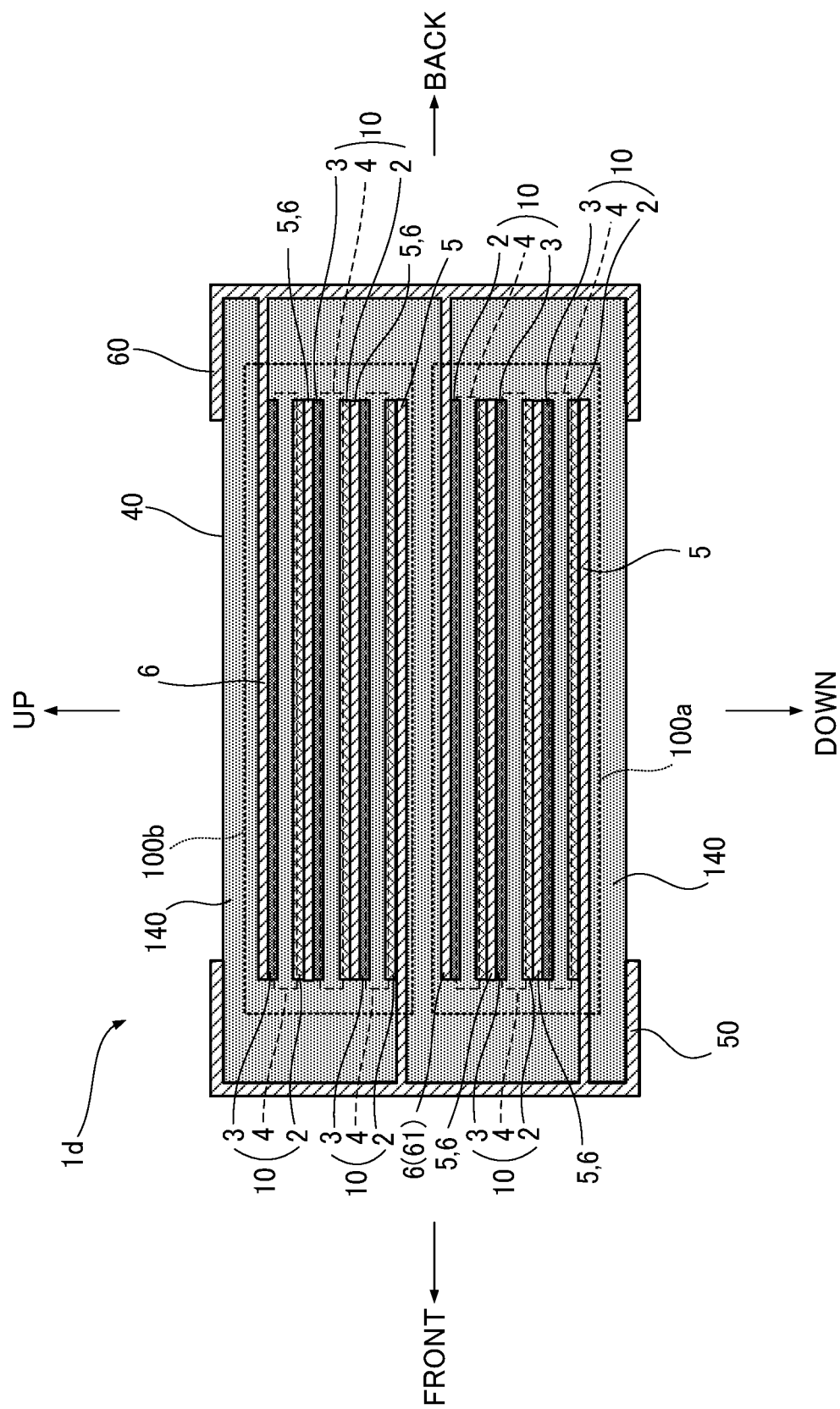
FIG. 9 is a view showing a modification of the all-solid-state battery according to the other embodiment.

Moreover, as shown in FIG. 9, a chip battery 1*d* in which both serial coupling and parallel coupling are present is possible. In the example shown in FIG. 9, two all-solid-state batteries (100*a*, 100*b*) each made up with three unit cells coupled in series are stacked in the up-down direction, and these two all-solid-state batteries (100*a*, 100*b*) are coupled in parallel. That is, this is a 3 series 2 parallel type chip battery 1*d*.

The cathode active material of the all-solid-state batteries (1*a* to 1*d*) according to the embodiments is a substance represented by the chemical formula $Li_2Fe_{(1-x)}MP_{(2-y)}A_yO_7$, wherein M is a metal, and A is an element of group 13 or 14 to be substituted for P. Specifically, a compound in which M is Co, A is Si or Al as well as x=1 and y=0.03 or y=0.07 is used as the cathode active material. Of course, even when M is substituted with any of the same metals Ti, V, Cr, and Ni as Co in the above-described chemical formula, the cathode active material is expected to be able to be utilized for a lithium secondary battery operated by multi-electron reactions. In particular, when M is substituted with Ni having properties similar to those of Co, it is expected to surely achieve similar characteristics to the embodiments. Note that the metal contained in the chemical formula is not limited to one type, but a plurality of metals among the above-described metals may be contained.

A only has to be an element capable of forming a structure in which 4 oxygen atoms (O) are disposed as similar to P, and may be substituted with not only Si and Al but also B, C, Ga, or Ge and the like of group 13 or group 14 located near P in the periodic table. Note that for A as well, a plurality of elements may be contained in the chemical formula.

What is claimed is:

1. An all-solid-state battery comprising:
   an electrode body in which a cathode layer that contains a cathode active material and a solid electrolyte, an electrolyte layer that is formed of the solid electrolyte, and an anode layer that contains an anode active material and the solid electrolyte are stacked in this order in an up-down direction, wherein
   the cathode active material is a compound represented by a chemical formula $Li_2Fe_{(1-x)}M_xP_{(2-y)}A_yO_7$, contains at least one metal of Ti, V, Cr, Ni, and Co as the M in the chemical formula, and contains at least one element of B, C, Al, Si, Ga, and Ge as the A in the chemical formula,
   the x in the chemical formula satisfies $0.8 < x < 1$,
   the y in the chemical formula satisfies $0 \leq y \leq 0.07$,
   the anode active material is an anatase titanium oxide represented by a chemical formula $TiO_2$, and
   at least one element of Al and Si is contained as the A in the chemical formula.

2. The all-solid-state battery according to claim 1, wherein
   the cathode active material contains at least one metal of Ni and Co as the M in the chemical formula.

3. The all-solid-state battery according to claim 1, wherein the cathode active material is a compound represented by a chemical formula $Li_2Fe_{(1-x)}Co_xP_2A_yO_7$, the x in the chemical formula satisfies $0.8 < x < 1$, and the cathode active material is such that the second Li contained in the chemical formula contributes to the Redox reaction, and has an energy density greater than 791 mWh/g.

4. The all-solid-state battery according to claim 1, wherein the solid electrolyte is a compound represented by a general formula $Li_{1.5}Al_{0.5}Ge_{1.5}(PO_4)_3$.

5. The all-solid-state battery according to claim 1, wherein with one of directions orthogonal to the up-down direction being defined as a front-back direction, a cathode terminal is formed on an end face of a battery main body formed of a cuboid-shaped sintered body on one side in the front-back direction, and an anode terminal is formed on an end face of the battery main body on an opposite side in the front-back direction, in the battery main body, one or more unit cells are buried in the solid electrolyte, in each unit cell, a cathode current collector and an anode current collector are stacked respectively on one side of the electrode body in the up-down direction and on an opposite side of the electrode body in the up-down direction, and a predetermined one of the cathode current collectors is coupled to the cathode terminal and a predetermined one of the anode current collectors is coupled to the anode terminal.

* * * * *